United States Patent [19]
Teder et al.

[11] Patent Number: 5,544,156
[45] Date of Patent: Aug. 6, 1996

[54] DIRECT SEQUENCE CDMA COHERENT UPLINK DETECTOR

[75] Inventors: Paul M. Teder, Täby; Lars–Magnus Ewerbring; Lars G. Brismark, both of Stockholm, all of Sweden

[73] Assignee: Telefonaktiebolaget LM Ericsson, Stockholm, Sweden

[21] Appl. No.: 235,527

[22] Filed: Apr. 29, 1994

[51] Int. Cl.$^6$ .......................... H04B 7/216; H04L 27/22
[52] U.S. Cl. .............................. 370/18; 370/84; 375/206; 375/325; 375/340
[58] Field of Search .................................. 370/17, 18, 79, 370/84, 110.1, 200, 205, 206, 324, 325, 340, 341, 342, 343; 329/304, 307

[56] References Cited

U.S. PATENT DOCUMENTS

| | | | |
|---|---|---|---|
| 4,435,822 | 3/1984 | Spencer et al. | 375/206 |
| 4,639,932 | 1/1987 | Schiff | 375/206 |
| 5,048,053 | 9/1991 | Mower et al. | 375/206 |
| 5,216,691 | 6/1993 | Kaufmann | 375/206 |
| 5,285,482 | 2/1994 | Sehier et al. | 375/354 |
| 5,329,547 | 7/1994 | Ling | 375/205 |
| 5,337,331 | 8/1994 | Sadot et al. | 375/340 |

FOREIGN PATENT DOCUMENTS

| | | |
|---|---|---|
| 0493904A2 | 7/1992 | European Pat. Off. . |
| 22823000A | 2/1995 | United Kingdom . |
| WO95/19664 | 7/1995 | WIPO . |

OTHER PUBLICATIONS

"An Analysis of Pilot Symbol Assisted Modulation for Rayleigh Fading Channels", James K. CAVERS, *IEEE Transactions on Vehicular Technology*, vol. 40, No. 4, pp. 686–693, Nov. 1991.

"Tradeoff Between Channel Coding and Spreading for DS–CDMA", Peter HOEHER, pp. 1–3, submitted to IEEE Trans. on Vehicular Technology.

"Near Maximum Likelihood Demodulation for M-ary Orthogonal Signalling", Rod WALTON et al., pp. 5–8, IEEE, 1993.

International Search Report completed 19 May 1995.

*Primary Examiner*—Alpus H. Hsu
*Attorney, Agent, or Firm*—Burns, Doane, Swecker & Mathis, L.L.P.

[57] ABSTRACT

A system and method for coherently demodulating an uplink signal in a multirate, CDMA system. By first demodulating information in a control channel which relates to the data rate of a data field in a frame of the data channel of the received signal, phase information can be derived so as to generate a reference for coherent demodulation.

22 Claims, 4 Drawing Sheets

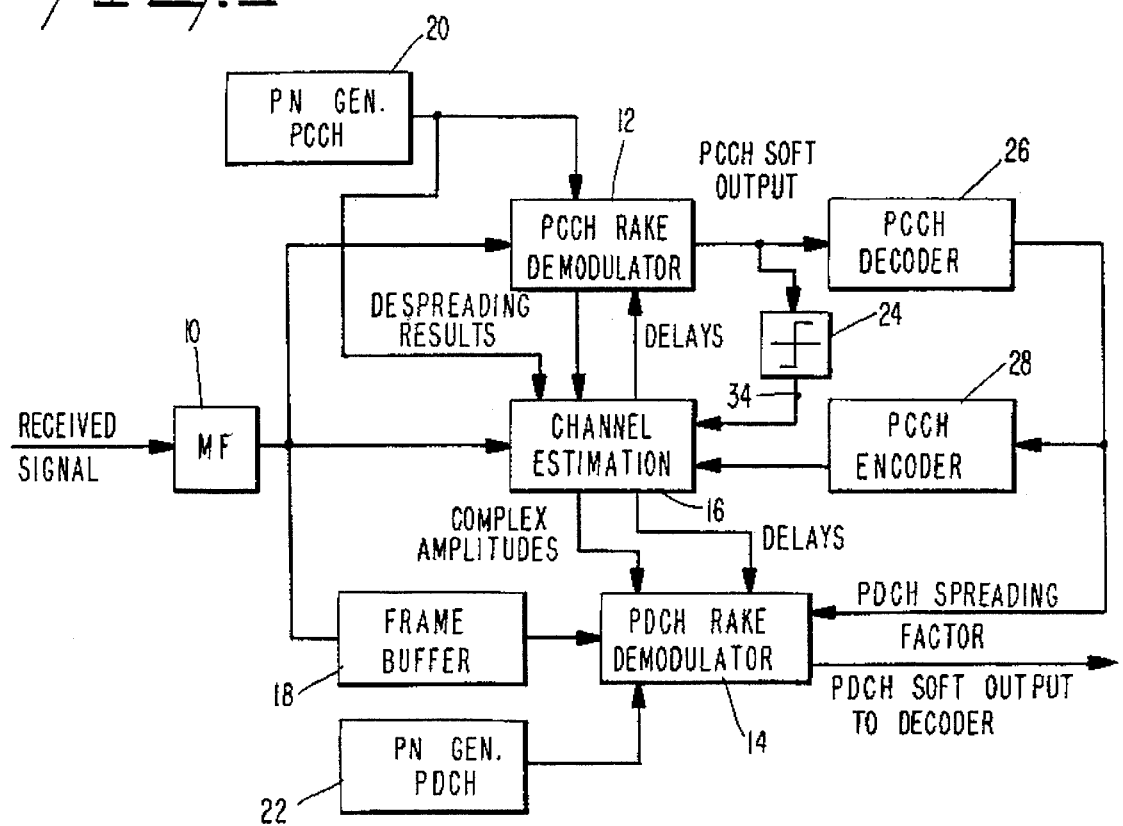
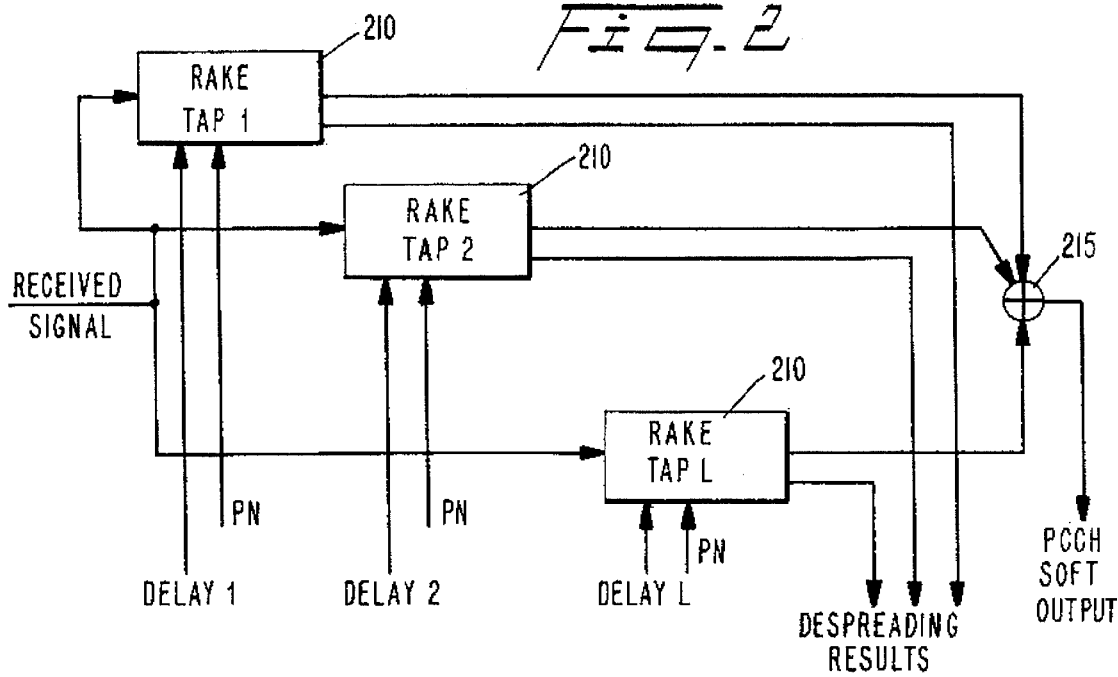

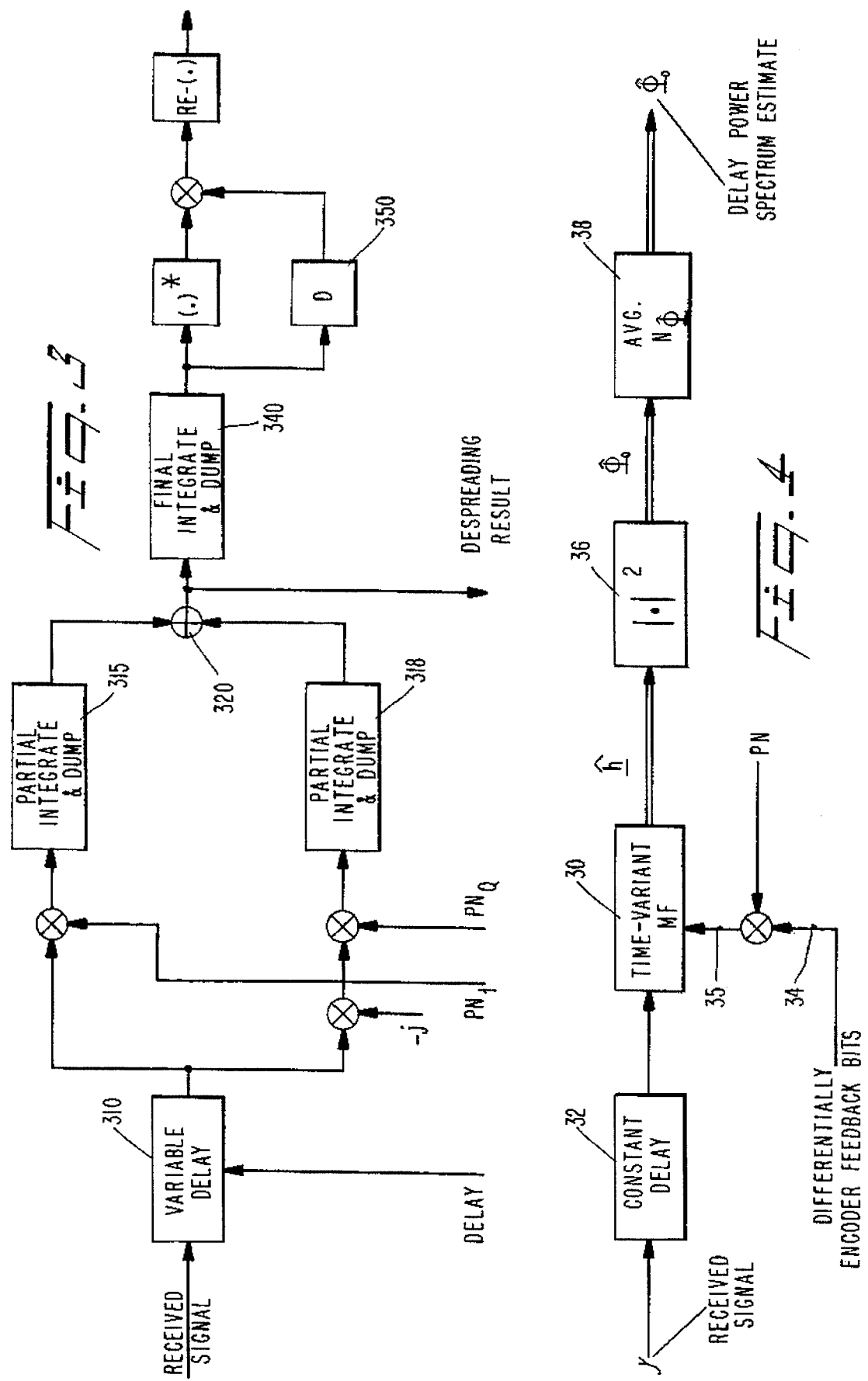

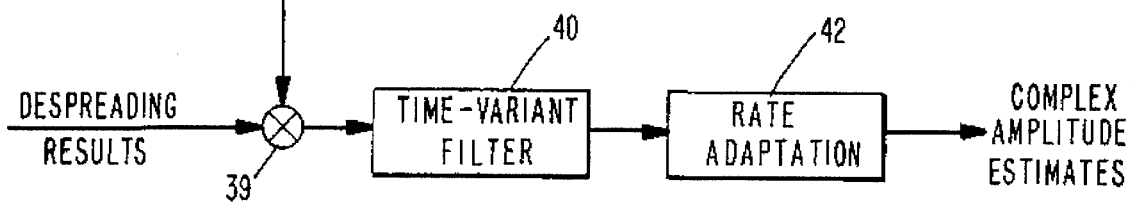
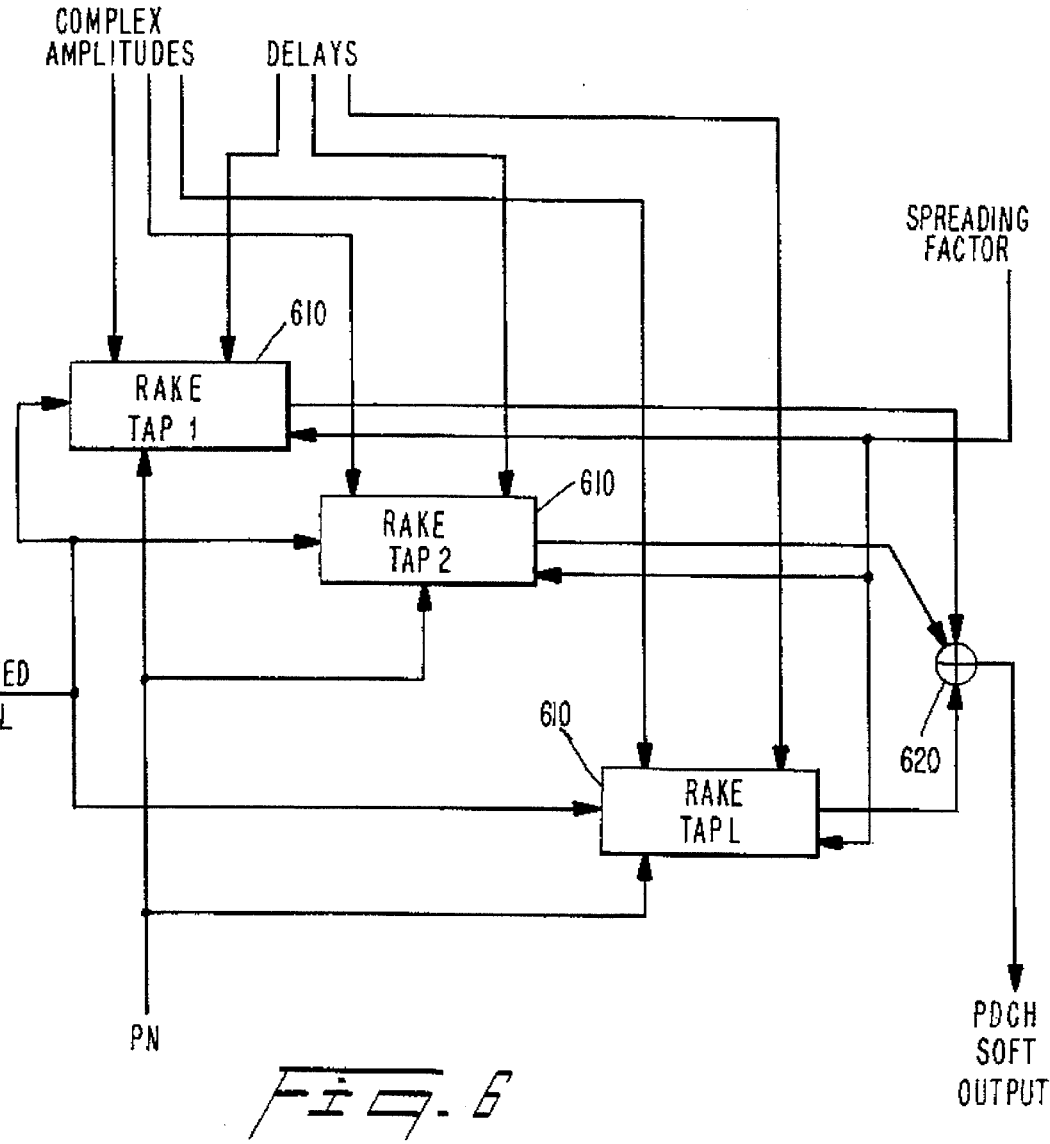

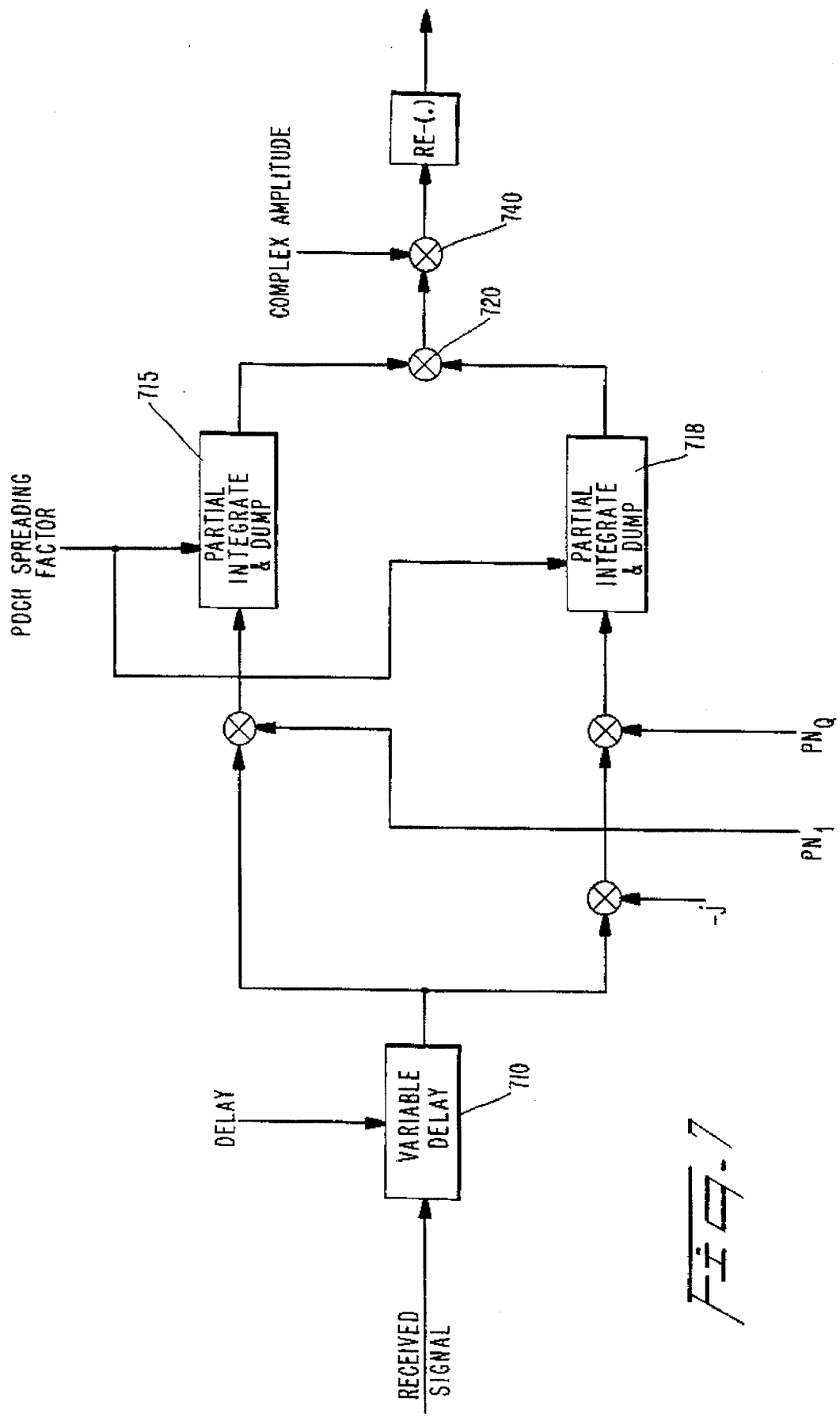

DIRECT SEQUENCE CDMA COHERENT UPLINK DETECTOR

BACKGROUND

The present invention relates generally to radiocommunication methods and systems and, more particularly, to the processing of code division multiple access (CDMA) signals.

The explosive growth in radio telecommunications requires continual improvement in the capacity, flexibility and quality of such systems. Evolution in this arena has seen the movement from analog to digital technology and from frequency division multiple access (FDMA) to time division multiple access (TDMA). Code division multiple access (CDMA) provides some special features as compared with current TDMA standards and may well be a good choice for future third generation systems. While changing among different technologies has increased capacity, improving the efficiency of system components is also necessary to provide the degree of additional capacity required by consumer demand. Thus, for example, continual efficiency improvements are being achieved in the transmitters and receivers of radiocommunication systems.

In receivers, reliable detection of data is dependent upon the ability of the receiver to resolve ambiguities in received signals. A receiver with superior detection performance relaxes the constraints of other parts of the communication system which translates into increased capacity, smaller size, reduced cost or some other advantage. For example, base stations with improved reception capabilities will allow mobile stations to use lower transmit power, resulting in immediate savings in battery power. Alternately, the improved signal detection can also be used to, for example, improve link quality.

Coherent detection, whereby the change of phase induced in a received radio signal by the radio channel is undone by correlation to a reference signal, is preferable for receivers to non-coherent detection which derives an estimate of the sought signal from both quadratures and thereby faces a loss of up to 3 dB relative to coherent detection. Thus, coherent rather than non-coherent detection is typically the preferred choice. Techniques for both coherent and non-coherent detection are well known, but their usage depends on the availability of reference signals. If a reference signal exists, coherent detection is the typical choice, otherwise non-coherent detection must be used. The reference signal can be a dedicated pilot signal or simply pilot symbols known to the receiver which are interspersed with the data signal.

Systems based on Time Division Multiple Access (TDMA) often incorporate pilot or reference symbols interspersed with data symbols. When information in one link is decoded, information in each time slot is considered individually, including the reference information. This reference information can either be lumped together in one portion of the time slot or spread throughout. In either case, the reference information is time multiplexed with user data. Various schemes are used to estimate the radio channel at points within the slot where no reference samples are available.

In direct sequence Code Division Multiple Access (CDMA) systems, transmission is continuous, i.e., users are distinguished through different codes rather than different combinations of carrier frequency and time slot as in TDMA systems. In the recently announced U.S. standards for CDMA systems, IS-95, coherent detection is assumed in the downlink of the system, i.e., from the fixed base station down to the mobile station. Since a base station can easily pool resources, all mobile stations in a cell share one pilot signal which provides a phase reference for coherent detection. Often, this pilot signal is transmitted with more power than the signals unique to each base station-mobile station link. Thus, a reliable reference of the radio channel is established.

Coherent detection is not, however, suggested in IS-95 for the uplink since coherent detection would not be supported in the uplink by any reference signals. In the uplink, signals from mobile stations traverse unique radio channels and thus a common pilot resource is not available. Moreover, the uplink modulation method is M-ary orthogonal signaling, which can easily be detected non-coherently by a square-law detector. Although coherent detection of an M-ary orthogonal signal per se can be achieved, such detection comes only with a considerable increase in complexity.

Coherent detection can also be obtained in DS-CDMA with pilot symbol aided detection techniques as described in P. Hoeher, "Tradeoff between Channel Coding and Spreading for DS-CDMA," RACE Mobile Telecommunications Workshop, Metz, June 1993. This approach is also problematic since, due to the fast variations of the channel, it would be necessary to distribute the pilot symbols over an entire frame. In a CDMA system with variable bitrates and spreading factors it would become complicated to introduce pilot symbols interleaved with the data sequence.

Absent some way in which coherent detection can be provided in the uplink, it will be necessary to use non-coherent detection and accept the corresponding reduction in system performance. Accordingly, it would be desirable to provide a system and method for coherent detection in, for example, the uplink of CDMA systems without introducing additional pilot symbols or signals.

SUMMARY

According to exemplary embodiments of the present invention, coherent detection in the uplink can be provided using information already provided in multirate CDMA systems for an independent purpose as a reference. For example, information relating to the data rate at which information in a data field of each frame is transmitted can be provided in a control channel, which is transmitted in parallel with the data channel, and demodulated prior to demodulation of the data field to provide phase and amplitude information for coherent detection.

One advantage of DS-CDMA is the capability to vary the information rate on a frame-by-frame basis. This capability is anticipated to be required in future systems where a multitude of transmission rates will be needed. In order to properly retrieve the data, the information rate for the data field of that frame can be provided as a tag containing field in a control channel. This tag can be drawn from a limited alphabet and can be transmitted with high redundancy. The bit rate of the control channel can be fixed and will then be known in the receiver.

As a first step in the decoding process, the tag is demodulated. Since no pilot signal is available, differentially coherent detection is used. Reliable detection of the tag can nonetheless be achieved due to the powerful coding provided thereto. Once the tag is known, it is then possible to form an estimate of the radio channel by re-encoding the tag bits onto the sampled signal. For each channel path the complex amplitude is found, i.e., the amplitude and phase, which in turn provides the phase information for the channel which can be used to coherently demodulate the data field.

The fixed bit rate at which the tag field is transmitted can be different than the bit rate in the sought data field and thus estimates are likely to not be aligned with the data bits to be detected. However, this can be compensated by, for example, a simple interpolation scheme between estimates from the reconstructed channel which are available at the bit rate of the tag field using knowledge of both the bit rate of the tag field and bit rate of the data field. In this way, estimates of the radio channel at the rate of the data field can be obtained, i.e., a pilot signal unique to each link is re-constructed.

Thus, the present invention provides a method and system for coherent detection, for example, in the uplink of a DS-CDMA system by transmitting on a separate PN-sequence which is synchronous in time to the PN-sequence used to convey the data, a control signal. This control signal can also convey, for example, the information bit rate used in a frame. The present invention results in superior decoding performance, which can be capitalized on by, for instance, savings in battery power and/or higher link quality.

BRIEF DESCRIPTION OF THE DRAWINGS

The foregoing, and other, objects, features and advantages of the present invention will be more readily understood upon reading the following detailed description in conjunction with the drawings in which:

FIG. 1 illustrates an exemplary base station receiver according to the present invention;

FIG. 2 illustrates an exemplary PCCH RAKE demodulator;

FIG. 3 illustrates an exemplary tap of the demodulator of FIG. 2;

FIG. 4 is a block diagram of an exemplary delay estimation scheme;

FIG. 5 is a block diagram illustrating amplitude estimation according to an exemplary embodiment;

FIG. 6 illustrates an exemplary PDCH RAKE demodulator; and

FIG. 7 illustrates an exemplary tap of the demodulator of FIG. 6.

DETAILED DESCRIPTION

According to exemplary embodiments of the present invention, DS-CDMA systems can support variable bit rate services, such as speech, by providing control information in each frame which specifies the instantaneous data symbol rate for that frame. In order to accomplish this in a regular time interval, physical channels can be organized in frames of equal length. Each frame carries an integer number of chips and an integer number of information bits.

Using this exemplary frame structure, bit rate control information can be provided for every CDMA frame by transmitting this information on a separate physical channel. The physical channels carrying the data and the control information can be denoted as physical data channel (PDCH) and physical control channel (PCCH), respectively. The spreading code, symbol rate, or equivalently spreading factor, of the PCCH are known a priori to the receiver.

Many potential advantages are attributable to variable rate transmission. For example, interference can be reduced for various users of the system since the chip rate is kept constant and a lower bit rate gives a higher spreading factor, thus allowing a lower transmit power. Those skilled in the art will readily appreciate how this ability to vary the information rate in a CDMA system can be used advantageously to vary other parameters.

Exemplary embodiments of the present invention provide systems and methods for coherently detecting DS-CDMA signals in such a variable rate transmission scheme on the uplink, i.e., at the base station. As mentioned previously, in order to successfully demodulate variable rate transmissions, the receiver uses information regarding the rate at which the data field is being transmitted. One way to accomplish this is to provide information in the PCCH which indicates for each frame the data rate at which the data field has been transmitted. It will appreciated, however, by those skilled in the art that in addition to the rate tag, the PCCH can also carry information about many other parameters of the corresponding frame in the PDCH, for example, power control commands.

The structure of an exemplary base station receiver is illustrated in FIG. 1. The received complex baseband signal is first filtered with the pulse-shape matched filter 10 and sampled at a rate of, for example, two samples per chip. Then the signal is distributed to the control channel and data channel RAKE demodulators 12 and 14, respectively, and the channel estimation unit 16. The demodulators 12 and 14 are also provided with the corresponding PN sequences for the PCCH and PDCH by PN sequence generators 20 and 22. As described above, a PCCH frame contains relevant information about the structure of the concurrently transmitted PDCH and, therefore, the PCCH information is to be decoded before the PDCH can be demodulated. Thus, a frame buffer 18 in front of the PDCH RAKE demodulator 14 delays input of the filtered signal thereto. Channel estimation is performed on the PCCH which is transmitted continuously. The presence of the PDCH depends on its data rate which can, for example, be zero during pauses in speech or data communications. If the PDCH is present, input from that channel could also be used to form channel estimates. Two decision feedback paths (one path including quantizer 24 and another path including PCCH decoder 26 and PCCH encoder 28) coming from the PCCH RAKE demodulator 12 are provided to obtain input signals for the channel estimation unit, as described in more detail below.

Since the PCCH is decoded before demodulating the PDCH, different detection schemes are used on the PDCH and the PCCH. The PDCH is coherently demodulated, while on the PCCH data are differentially encoded to allow for differentially coherent demodulation. Differentially coherent demodulation is a scheme that uses the previously detected symbol as a reference for the radio channel which is used herein since no information of the complex amplitude is known. For coherent detection the receiver uses information regarding the delays and the complex amplitudes of the rays that are to be used in the demodulator. The delays can be assumed to change by less than half of a chip interval $T_c/2$ (where, for example, $T_c$=200 ns for a 5 Mchip/s information rate), within one frame of, for example, 10 ms. Therefore, delay estimation can be very precise.

To obtain precise complex amplitude estimates of the rays, on the other hand, is more difficult because the amplitudes change at a faster rate than the delays. A complex amplitude estimation unit using previously detected bits as a reference, should have an effective window length shorter than the minimal coherence time of the channel, i.e., the inverse of twice the maximum doppler frequency $f_{D,max}$ so that channel noise does not unduly effect the amplitude estimates. Thus, for example, a window length of less than 2 ms would be appropriate for a maximum doppler frequency of 250 Hz. Taking this desirable feature into account together with the period of the channel-encoding bits on the PCCH, which can be, for example about 250 ps, a modulation scheme with differentially encoded data can be employed. In such a modulation scheme, complex amplitude estimation is done implicitly on a single bit period.

An exemplary PCCH RAKE demodulator will now be described with respect to FIGS. 2 and 3. In FIG. 2, the received signal is sent to each of a plurality of RAKE taps 210 each of which have a different delay supplied thereto as well as the PN sequence. Each RAKE tap 210 outputs a despreading result and a demodulated value, the despreading results being sent to the channel estimation unit 16 and the demodulated values being summed at block 215 to provide the control channel soft output. FIG. 3 illustrates each RAKE tap 210 in somewhat more detail. The received signal is first delayed at 210 by the appropriate delay for that tap. After being delayed, the complex signal is multiplied with the inphase and quadrature components of the PN sequence and partially integrated at blocks 315 and 318 before being recombined at summer 320. The output of summer 320 is taken as the despreading result for that tap prior to being finally integrated at block 340. The despreading result can be integrated over a control channel bit or partial correlations of a fraction of a bit duration. Partial correlations are necessary when the channel varies significantly during a bit period. The resultant value is differentially demodulated using a delayed value of the received signal at block 350 since no complex amplitude information is available for the control channel. The demodulated output is then sent to summer 215 to be added with the outputs of the other taps 210.

After differentially coherent demodulation of the PCCH and soft decision decoding, the PCCH can be viewed as an effective pilot channel. Decoding errors on the PCCH will unavoidably lead to a lost PDCH frame, because the information transmitted on the PCCH, e.g., the correct spreading factor, is required for PDCH demodulation. Thus, information on the PCCH is protected by a powerful encoding scheme to minimize such errors. Since the decoded and re-encoded PCCH is an effective pilot channel, it can be used for complex amplitude estimation of the rays. The effective estimation window length is determined by the filter coefficients described in more detail below. This window length can now be doubled because not only the past signal parts can be used for the estimation process, as in the differentially coherent demodulation scheme, but also the future signal parts can be used to estimate the amplitude of a ray at a particular time. Having an increased window length will improve performance of the receiver and is sufficient to provide accurate estimates of the complex amplitudes of rays and allow for coherent demodulation of the PDCH.

As can be seen from the foregoing, a channel estimation process according to exemplary embodiments of the present invention can be divided into two general steps: delay estimation and complex amplitude estimation.

The delays are estimated on a frame by frame basis. A long-term delay power spectrum (DPS) is estimated using one frame of the PCCH. The delays of the strongest rays are selected for use in demodulating the PCCH and PDCH in the next frame. Instead of estimating a long-term DPS, a short-term DPS can be estimated via a sliding window and the simultaneously strongest rays can then be used for demodulation.

FIG. 4 is a block diagram of an exemplary delay estimation unit according to the present invention. The received signal is input to a time variant matched filter 30 for estimating the power at a particular delay 32 in the DPS. Alternately, to reduce hardware complexity, the matched filter 30 can be replaced by a set of correlators (not shown) that use only portions of the received energy for this purpose.

The filter coefficients input on line 34 are taken from the PCCH PN sequence provided by generator 20 which is modulated, as in the transmitter, by differentially encoded bits. Since these differentially encoded bits are a priori unknown, they are fed back from the PCCH RAKE demodulator 12 through quantizer 24. In order to meet timing requirements in the hardware, the bits are taken from the PCCH demodulator before decoding, i.e., from the feedback path of FIG. 1 including quantizer 24. Alternately, if timing constraints are relaxed, these bits could be taken from block 28. The received signal is delayed at block 32 at the input of the channel estimation unit until the corresponding filter coefficients are available on output 35 of the modulator. At the output of the matched filter 30 a per measurement interval estimate $\hat{h}$ of the channel impulse response vector h is generated.

During a measurement interval, the filter coefficients of the time-variant matched filter 30 are kept fixed. The length of the interval determines the length of the estimated impulse response vector. Therefore, the interval can be chosen according to the longest possible impulse response to be taken into account. The number of filter coefficients in the matched filter 30 determines the correlation length or processing gain $C_L$. On the one hand, the gain $C_L$ should be large enough to raise the impulse response above the noise floor, on the other hand the correlation time (or gain $C_L$) should be small compared to the coherence time of the channel, i.e., the inverse of twice the maximum Doppler frequency $f_{D,max}$. For example, the correlation length can be 500 μs.

A first short-term DPS estimate $\hat{\phi}_0$ is obtained from the impulse response vector $\hat{h}$ by taking absolute values and squaring at block 36. Since the processing gain may have been insufficient for a good estimate, several, i.e., $N_{100}$, subsequent estimates, $\hat{\phi}_0$ are averaged to provide a final estimated $\hat{\phi}$ at block 38. The delay power spectrum $\hat{\phi}$ is then searched to identify the strongest rays. The delays corresponding to those rays are sufficient to run both the PCCH and PDCH RAKE demodulators 12 and 14 in the next frame.

For the coherently operating PDCH RAKE demodulator 14 information is needed regarding the continuously changing complex amplitude of the rays on a per demodulated ray basis. This information is obtained by processing the despreading results of the corresponding PCCH RAKE demodulated ray in channel estimation unit 16, this part of channel estimation unit 16 being shown in FIG. 5.

The despreading results can be viewed as noisy samples of the time-variant complex amplitude modulated by the PCCH bits. The modulation can be removed nearly perfectly because, after decoding the PCCH at decoder 26, the modulating bits can be obtained easily by re-encoding the information bits at encoder 28 as they were originally encoded in the transmitter. This procedure transforms the PCCH into a pilot channel for PDCH demodulation.

After removing the modulation at block 39, the despreading results are filtered to reduce the noise by a time-variant filter 40. The coefficients of filter 40 determine the estimation window length. According to the exemplary embodiment of FIG. 5, these coefficients are fixed based on the maximum expected doppler frequency. However, these coefficients could be varied during processing to provide a sliding estimation window which compensates for variations in the Doppler spectra. Of course, changes in the estimation window will induce commensurate changes in the radio channel so that if varying coefficients are used for filter 40, some type of iterative process or decision scheme will be needed to properly compensate for such changes.

A computationally efficient filtering method is to run a recursive exponential window in forward and backward direction on the demodulated despreading results of a whole PCCH frame and combine the outcomes. The loss in performance is almost negligible compared to an optimal time-variant Wiener filter that also exploits the generally unknown Doppler spectrum but which is computationally much more complicated. Before the smoothed complex amplitude estimates can be used for PDCH demodulation, a rate adaptation unit 42 can be used to adjust the estimates if the bit rates of the PCCH and PDCH differ.

The complex amplitudes and delays received from channel estimation unit 16 are then sent to the PDCH RAKE demodulator 14 for coherent detection of that channel. An exemplary PDCH RAKE demodulator is illustrated in more detail in FIG. 6. Therein the received signal is distributed to each of the plurality of RAKE taps 1 through L (for simplicity of the figures only taps 1, 2 and L are illustrated in FIGS. 2 and 6). The complex amplitude information and delay information as well as the spreading factors of the control channel are also used in each of the RAKE taps 610 as illustrated in more detail in FIG. 7. The received signal is again delayed by the amount determined by the channel estimation unit at block 710 and multiplied with the inphase and quadrature components of the PN sequence for partial integration at blocks 715 and 718. The resultant values are summed at 720 and demodulated using the knowledge of the complex amplitude of the corresponding ray. The output of the tap is then summed at 620 to provide the soft output of the data channel.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A receiver comprising:

means for receiving a data channel having a variable transmission rate data field and a control channel associated with said data channel, said control channel including information indicating a transmission rate of said variable transmission rate data field;

means for demodulating said control channel and generating channel information therefrom; and means for coherently demodulating said data channel using the channel information generated by said means for demodulating said control channel.

2. The receiver of claim 1 further comprising:

means for determining a channel estimate based on the channel information input from said means for demodulating said control channel; and means for providing channel estimate parameters to said means for coherently demodulating said data channel, wherein said means for demodulating said data channel uses said channel estimate parameters to coherently demodulate said data channel.

3. The receiver of claim 1 wherein said channel information includes at least one of: despreading results, coefficients, and modulating bits of said control channel.

4. The receiver of claim 2 wherein said channel information includes at least one of: despreading results, coefficients, and modulating bits of said control channel.

5. The receiver of claim 4, wherein said means for determining a channel estimate further comprises:

means for estimating delays of rays in said received signal based on said received signal and said coefficients.

6. The receiver of claim 5, wherein said means for determining a channel estimate further comprises:

means for estimating a complex amplitude of rays in said received uplink signal based on said despreading results and said modulating bits of said control channel.

7. The receiver of claim 6, wherein said means for estimating a complex amplitude uses a fixed estimation window.

8. The receiver of claim 6, wherein said means for estimating a complex amplitude uses a variable estimation window.

9. A receiver comprising:

an antenna for receiving a data channel and a control channel, said control channel including information indicating a rate of transmission of data in said data channel;

a control channel demodulator which demodulates said control channel including said information to generate a demodulated control channel signal and despreading results;

a channel estimator that uses said despreading results of said demodulated control channel signal to generate estimates of ray complex amplitudes an delays; and a data channel demodulator which coherently demodulates said data channel using said ray complex amplitudes and delays.

10. The receiver of claim 9 wherein said channel estimator further comprises:

a delay estimating circuit including a time-variant matched filter, having coefficients at least partially determined by feedback bits of said demodulated control channel signal, which generates a channel impulse response.

11. The receiver of claim 9 wherein said channel estimator further comprises:

a delay estimating circuit including a set of correlators which generates a channel impulse response.

12. The receiver of claim 9 wherein said channel estimator further comprises:

a complex amplitude estimating circuit including means for removing modulation of the despreading results, a filter and a rate adaptor which compensates for variations in transmission rate between the control channel and the data channel.

13. The receiver of claim 12 wherein said filter has a fixed set of coefficients.

14. The receiver of claim 12 wherein said filter has a variable set of coefficients.

15. The receiver of claim 12 further comprising:

a channel decoder for decoding the demodulated control channel signal; and an encoder for re-encoding said decoded signal to generate modulating bits of said control channel;

wherein said modulating bits are provided to said complex amplitude estimating circuit to remove the modulation from the despreading results.

16. The receiver of claim 9, further comprising:

a frame buffer for delaying distribution of each frame of said data channel to said data channel demodulator until corresponding estimates for that frame are available from the channel estimator.

17. A method for coherently demodulating received CDMA signals, comprising the steps of:

providing a control channel including information indicating a rate of transmission of data in a data channel of said received CDMA signals;

demodulating said control channel of said received CDMA signals;

generating a reference signal using information from said demodulating step; and coherently demodulating said data channel of said received CDMA signals using said reference signal.

18. The method of claim 17 further comprising the steps of:

deriving a channel estimate using information generated by said demodulating of said control channel; and using said channel estimate to generate said reference signal.

19. The method of claim 17 wherein said step of generating a reference signal further comprises the steps of:

estimating delay of rays in said control channel; and estimating a complex amplitude of said rays in said control channel.

20. The method of claim 19 wherein said step of estimating a complex amplitude further comprises the step of:

using a variable set of filter coefficients.

21. The method of claim 19 wherein said step of estimating a complex amplitude further comprises the step of:

using a fixed set of filter coefficients.

22. The method of claim 17 further comprising the step of:

delaying distribution of frames of the received CDMA signal to a coherent data channel demodulator until corresponding reference signals have been generated.

* * * * *